US012790240B2

(12) United States Patent
Skardon

(10) Patent No.: US 12,790,240 B2
(45) Date of Patent: Nov. 10, 2026

(54) SYSTEM AND METHODS OF REMOVING IONS FROM DRAINAGE WATER

(71) Applicant: Tailwater Systems, LLC, Seaside, CA (US)

(72) Inventor: John N. Skardon, Seaside, CA (US)

(73) Assignee: Tailwater Systems, LLC, Seaside, CA (US)

( * ) Notice: Subject to any disclaimer, the term of this patent is extended or adjusted under 35 U.S.C. 154(b) by 0 days.

(21) Appl. No.: 19/171,873

(22) Filed: Apr. 7, 2025

(65) Prior Publication Data

US 2025/0230069 A1 Jul. 17, 2025

Related U.S. Application Data

(63) Continuation of application No. PCT/US2023/076214, filed on Oct. 6, 2023.

(Continued)

(51) Int. Cl.
*C02F 1/42* (2023.01)
*B01J 41/12* (2017.01)

(Continued)

(52) U.S. Cl.
CPC ................. *C02F 1/42* (2013.01); *B01J 41/12* (2013.01); *B01J 47/02* (2013.01); *B01J 49/07* (2017.01);

(Continued)

(58) Field of Classification Search
CPC .................. C02F 1/42; C02F 2001/422; C02F 2101/101; C02F 2101/12; C02F 2101/163;

(Continued)

(56) References Cited

U.S. PATENT DOCUMENTS 5,084,185 A 1/1992 Solt et al.
2005/0115905 A1 6/2005 Yan et al.

(Continued)

FOREIGN PATENT DOCUMENTS

DE 3515299 A1 10/1986
WO WO-2022113741 A1 * 6/2022 ............. B01J 39/07

OTHER PUBLICATIONS

Berbar, Y., Amara, M. and Kerdjoudj, H., 2008. Anion exchange resin applied to a separation between nitrate and chloride ions in the presence of aqueous soluble polyelectrolyte. Desalination, 223(1-3), pp. 238-242 (Year: 2008).*

(Continued)

*Primary Examiner* — Benjamin L Lebron
*Assistant Examiner* — Bernadette Karen Mcgann
(74) *Attorney, Agent, or Firm* — Heslin Rothenberg Farley & Mesiti P.C.

(57) ABSTRACT

An ion exchange system includes a first ion exchange column containing a first resin having an affinity for sulfate ions and nitrate ions that is greater than the first resin's affinity for chloride ions. The first ion exchange column is configured to pass a predetermined mass flow rate of drainage water therethrough. A second ion exchange column is connected in series with the first ion exchange column. The second ion exchange column contains a second resin having an affinity for chloride ions and is configured to pass the same predetermined mass flow rate of the same drainage water therethrough. As the drainage water passes through the first ion exchange column, primarily sulfate ions and/or nitrate ions are removed from the drainage water. As the drainage water passes through the second ion exchange column, primarily chloride ions are removed from the drainage water.

13 Claims, 9 Drawing Sheets

Related U.S. Application Data

(60) Provisional application No. 63/378,742, filed on Oct. 7, 2022.

(51) Int. Cl.

| | |
|---|---|
| ***B01J 47/02*** | (2017.01) |
| ***B01J 49/07*** | (2017.01) |
| ***B01J 49/57*** | (2017.01) |
| ***C02F 101/10*** | (2006.01) |
| ***C02F 101/12*** | (2006.01) |
| ***C02F 101/16*** | (2006.01) |

(52) U.S. Cl.
CPC ......... *B01J 49/57* (2017.01); *C02F 2001/422* (2013.01); *C02F 2101/101* (2013.01); *C02F 2101/12* (2013.01); *C02F 2101/163* (2013.01); *C02F 2201/005* (2013.01); *C02F 2301/08* (2013.01); *C02F 2303/16* (2013.01)

(58) Field of Classification Search
CPC ............ C02F 2201/005; C02F 2301/08; C02F 2303/16; C02F 1/28; C02F 2001/425; C02F 2001/427; C02F 1/32; B01J 41/12; B01J 47/02; B01J 49/07; B01J 49/57; B01J 37/30; B01J 31/08; B01J 47/00; B01J 47/026; B01J 49/05–09; B01D 15/361; B01D 15/362; B01D 15/363; B01D 15/364; B01D 15/00; B01D 2253/206
See application file for complete search history.

(56) References Cited

U.S. PATENT DOCUMENTS

| | | | | |
|---|---|---|---|---|
| 2012/0318743 | A1* | 12/2012 | Van Niekerk | B01J 49/08 210/201 |
| 2018/0118598 | A1* | 5/2018 | Green | B01D 15/1864 |
| 2022/0274100 | A1* | 9/2022 | Mukai | B01J 49/85 |
| 2024/0002263 | A1* | 1/2024 | Ishikawa | B01J 47/028 |

OTHER PUBLICATIONS

Hekmatzadeh, A.A., Karimi-Jashani, A., Talebbeydokhti, N. and Kløve, B., 2012. Modeling of nitrate removal for ion exchange resin in batch and fixed bed experiments. Desalination, 284, pp. 22-31 (Year: 2012).*

Purolite A520E Product Data Sheet (Sep. 7, 2012) (Year: 2012).*

Amberlite IRA 900 Product Data Sheet (Jun. 8, 2019). (Year: 2019).*

Rokicki, C.A. and Boyer, T.H., 2011. Bicarbonate-form anion exchange: Affinity, regeneration, and stoichiometry. Water research, 45(3), pp. 1329-1337 (Year: 2011).* https://www.instructables.com/Make-Co2-for-Sparkling-Water/ (Year: 2017).*

Zareie, H., Yazdani, F. and Mokhtarani, B., 2022. Removal of water nitrate using modified Purolite A520E resin, synthesis and experimental design. Materials Chemistry and Physics, 285, p. 126098 (Year: 2022).*

Samatya, S., Kabay, N., Yüksel, Ü., Arda, M. and Yüksel, M., 2006. Removal of nitrate from aqueous solution by nitrate selective ion exchange resins. Reactive and Functional polymers, 66(11), pp. 1206-1214. (Year: 2006).*

International Search Report and Written Opinion issued in PCT/US23/76214 mailed May 2, 2024.

* cited by examiner

FIG. 10

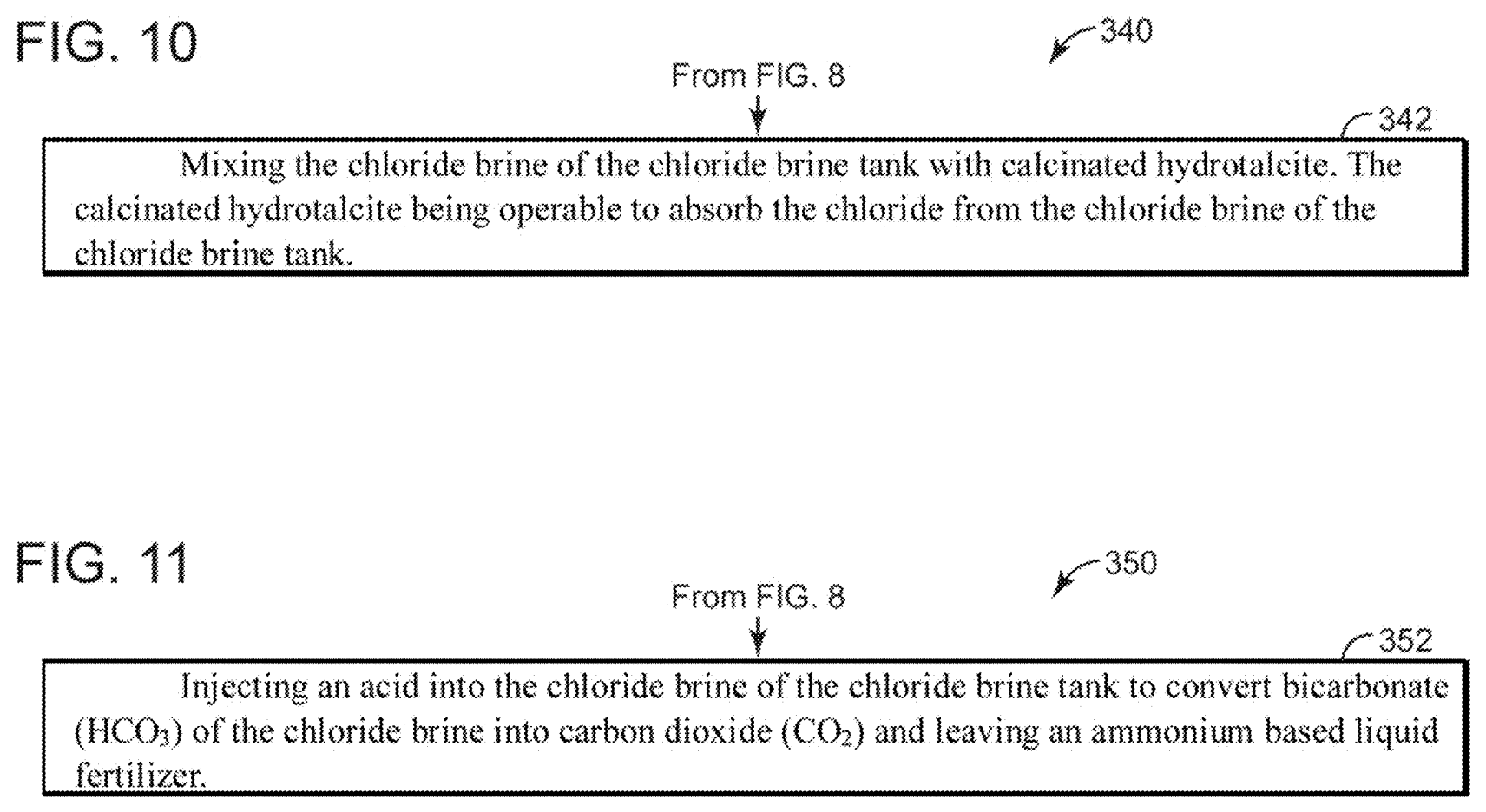

340

From FIG. 8

342

Mixing the chloride brine of the chloride brine tank with calcinated hydrotalcite. The calcinated hydrotalcite being operable to absorb the chloride from the chloride brine of the chloride brine tank.

FIG. 11

350

From FIG. 8

352

Injecting an acid into the chloride brine of the chloride brine tank to convert bicarbonate ($HCO_3$) of the chloride brine into carbon dioxide ($CO_2$) and leaving an ammonium based liquid fertilizer.

SYSTEM AND METHODS OF REMOVING IONS FROM DRAINAGE WATER

CROSS REFERENCE TO RELATED APPLICATIONS

This application is a continuation application of, and claims priority to, PCT Patent Application No. PCT/US2023/076214 filed on Oct. 6, 2023; which claims priority to U.S. Provisional Patent Application No. 63/378,742, filed on Oct. 7, 2022. The entire contents of the aforementioned applications are hereby incorporated herein by reference.

TECHNICAL FIELD

The present disclosure relates to systems and methods of removing ions from drainage water. More specifically, the disclosure relates to ion exchange systems and methods for removing sulfate, nitrate and chloride ions from drainage water.

BACKGROUND

Positively (cations) and negatively (anions) charged ions are often present in irrigation water and are nearly always present in agricultural drainage water in large amounts (e.g., thousands of mg/L). Historically, farmers have not treated their effluent or drainage to lower these dissolved ions, but instead have relied on the local receiving ecosystem to recycle them. However, with the dramatic increase in the use of synthetic fertilizer worldwide after World War 2, local ecosystems became overwhelmed with the volume and high concentrations of nutrients, e.g., sulfates, nitrates, etc., that were flowing off of existing croplands.

As a result, many wells, rivers, and lakes began accumulating nitrate, sulfate, and chloride related salts. Harmful algal blooms became common in nearly every river system worldwide.

While sulfate and nitrate ions can be easily recycled and reused, chloride ions tend to accumulate in recycle loops of ecosystems. Chloride toxicity can damage crop yields at levels as low as 100 mg/L and is very difficult to remove from drainage water. Currently, farmers often apply a second irrigation set (with no nutrients) in an attempt to leach chloride in soils or growing substrates. Problematically, this practice dramatically increases water use and continuously pumps chloride into groundwater via leaching.

Additionally, rainfall is becoming less predictable and/or occurring in more violent storms due to the effects of climate change. As a result, growers have evermore increasing difficulty in preventing the resulting increase in salinity in their soils and groundwater.

Membrane separations, such as reverse osmosis, will separate all of the ions from the water as dissolved solids. However, the brine that is constantly generated will have roughly two times the resulting total dissolved solids of the unprocessed water. Problematically, farmers do not have a method for reusing this high concentration of brine other than land application, which is illegal in many states in the United States. Additionally, commercial reverse osmosis systems consume a relatively large amount of power, which is becoming an increasingly expensive burden on farmers.

Accordingly, there is a need for systems and methods that enable efficient recycling of valuable nutrients such as nitrate ions and sulfate ions, while permanently segregating harmful ions such as chloride ions. There is also a need to remove these ions in a cost effective manner and at relatively low power levels. There is also a need to remove these ions in a way that produces relatively low concentrations of total dissolved solids in the brine generated from the ion removal process.

BRIEF DESCRIPTION OF THE INVENTION

The present disclosure offers advantages and alternatives over the prior art by providing a novel ion exchange system having two ion exchange columns connected in series. The first ion exchange column is configured to remove the valuable recyclable nutrients, such as nitrate ions and sulfate ions. The second ion exchange column is configured to remove the harmful ions, such as chloride ions. The ion exchange system consumes relatively low amounts of power compared to reverse osmosis systems and produces much less concentrations of total dissolved solids in the generated brine compared to reverse osmosis systems.

Additionally, the novel ion exchange system includes a novel regeneration system, which efficiently regenerates the first and second ion exchange columns after ion exchange with drainage water has occurred. Moreover, the regeneration system includes a novel chloride brine system, which sequesters the chloride ions as a solid in a cost effective manner.

An ion exchange system in accordance with one or more aspects of the present disclosure includes a first ion exchange column containing a first resin having an affinity for sulfate ions and nitrate ions that is greater than the first resin's affinity for chloride ions. The first ion exchange column is configured to pass a predetermined mass flow rate of drainage water therethrough. The drainage water has chloride ions and at least one of sulfate ions and nitrate ions contained therein. A second ion exchange column is connected in series fluid communication with the first ion exchange column. The second ion exchange column contains a second resin having an affinity for chloride ions. The second ion exchange column is configured to pass the same predetermined mass flow rate of the same drainage water therethrough. As the drainage water passes through the first ion exchange column, primarily the at least one of the sulfate ions and nitrate ions are removed from the drainage water and exchanged for first ions in the first resin. As the drainage water passes through the second ion exchange column, primarily chloride ions are removed from the drainage water and exchanged for second ions in the second resin.

A regeneration system in accordance with one or more aspects of the present disclosure enables the regeneration of first ions in a first resin of a first ion exchange column and second ions in a second resin of a second ion exchange column with bicarbonate ions after a flow of drainage water has passed through the first and second ion exchange columns. The regeneration system includes a first tank configured to contain a regenerate solution of ammonium bicarbonate. The first tank is in selective fluid communication with a first three-way valve. A second tank is configured to contain fresh water. The second tank is in selective fluid communication with the first three-way valve. A first pump has an intake port in fluid communication with the first three-way valve. A second three-way valve is in fluid communication with an output port of the first pump and in selective fluid communication with the first ion exchange column and the second ion exchange column. The first and second three-way valves are operable to selectively provide fluid communication between:

the first tank and the first ion exchange column, the first tank and the second ion exchange column, the second tank and the first ion exchange column, and the second tank and the second ion exchange column.

A method of removing ions from drainage water in accordance with one or more aspects of the present disclosure includes passing drainage water having chloride ions and at least one of sulfate ions and nitrate ions through a first ion exchange column at a predetermined mass flow rate. The first ion exchange column contains a first resin having an affinity for sulfate ions and nitrate ions that is greater than the first resin's affinity for chloride ions. Bicarbonate ions are exchanged in the first resin with primarily the at least one of sulfate ions and nitrate ions in the drainage water. The drainage water is passed through a second ion exchange column at the same predetermined mass flow rate. The second ion exchange column contains a second resin having an affinity for chloride ions. Bicarbonate ions are exchanged in the second resin with primarily the chloride ions in the drainage water.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

BRIEF DESCRIPTION OF THE DRAWINGS

The disclosure will be more fully understood from the following detailed description taken in conjunction with the accompanying drawings, in which:

FIG. 10 depicts a flow diagram of another method of processing the chloride brine tank of FIG. 8, according to aspects described herein; and FIG. 11 depicts a flow diagram of another method of processing the chloride brine tank of FIG. 8, according to aspects described herein.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to #1%, such as less than or equal to ±0.5%, such as less than or equal to ±0.2%, such as less than or equal to ±0.1%, such as less than or equal to ±0.05%.

Figure 1:
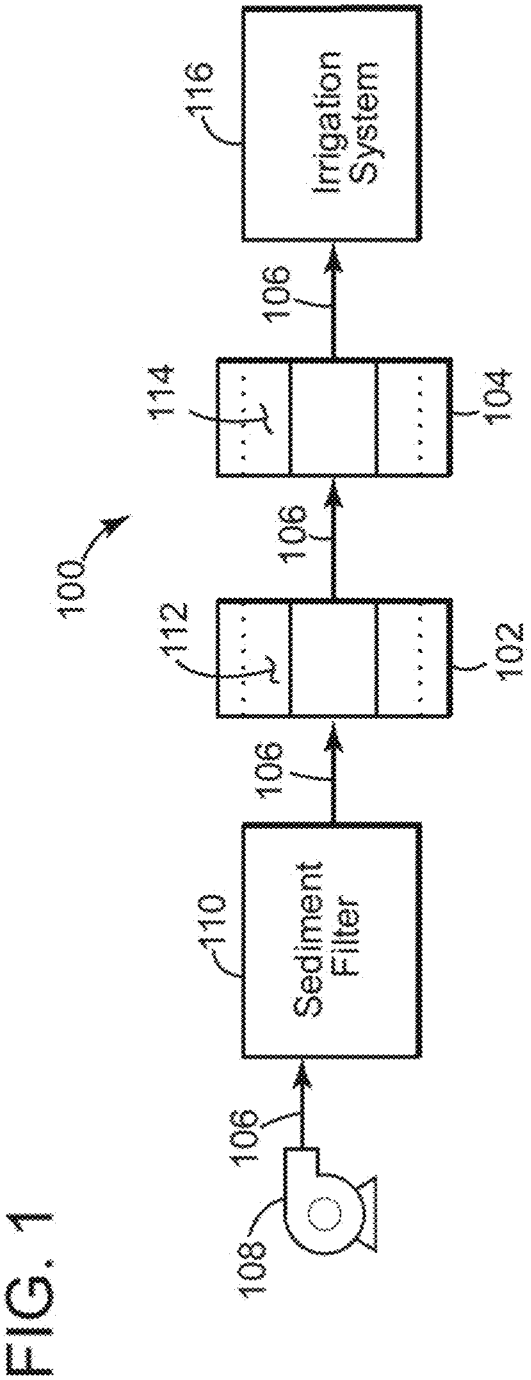
FIG. 1 depicts an example of a schematic view of an ion exchange system having a first ion exchange column in series fluid communication with a second ion exchange column to remove ions from a flow of drainage water, according to aspects described herein.

Referring to FIG. 1, an example is depicted of a schematic view of an ion exchange system 100 having a first ion exchange column 102 in series fluid communication with a second ion exchange column 104 to remove ions from a flow of drainage water 106, according to aspects described herein. The drainage water 106 may be irrigation water that is used to irrigate crops in an agricultural system and then drained through an agricultural drainage system. Such drainage water often contains chloride ions, sulfate ions and/or nitrate ions that should be separated from the drainage water before being returned to the local ecosystem.

The ion exchange system 100 may included a drainage water pump 108, which may pump the drainage water 106 through a sediment filter 110 at a predetermined mass flow rate, wherein the mass flow rate may be considered to be the mass of drainage water that passes through an area per unit of time. From the sediment filter 110, the filtered drainage water 106 may then be pumped into the first ion exchange column 102.

The first ion exchange column 102 contains a first resin 112, which has an affinity for sulfate ions and nitrate ions that is greater than the first resin's affinity for chloride ions. The first ion exchange column 102 is configured to pass the predetermined mass flow rate of drainage water 106 therethrough. The drainage water 106 may have chloride ions and at least one of sulfate ions and nitrate ions contained therein. However, as is often the case, the drainage water 106 may contain substantial amounts of all three chloride ions, sulfate ions and nitrate ions.

The second ion exchange column 104 is connected in series fluid communication with the first ion exchange column 102. The second ion exchange column 104 contains a second resin 114, which at least has an affinity for chloride ions. However, the second resin 114 may also have an affinity for sulfate ions and nitrate ions that is greater than the second resin's affinity for chloride ions. Moreover, the second resin may be substantially the same as the first resin. The second ion exchange column 104 is also configured to pass the same predetermined mass flow rate of the same drainage water 106 therethrough.

As the drainage water 106 passes through the first ion exchange column 102, primarily the at least one of the sulfate ions and nitrate ions are removed from the drainage water 106 and exchanged for first ions in the first resin 114. In other words, if the drainage water 106 includes primarily sulfate ions and chloride ions, then the first ion exchange column 102 may remove primarily the sulfate ions. Additionally, if the drainage water 106 includes primarily nitrate ions and chloride ions, then the first ion exchange column may remove primarily the nitrate ions. However, if both sulfate ions and nitrate ions are present in the drainage water 106, then the first ion exchange column 102 may remove primarily both the sulfate ions and the nitrate ions and exchange them for the first ions in the first resin 112.

The first ions in the first resin 112 may be, for example, bicarbonate ions. The bicarbonate ions may exchange substantially one bicarbonate ion for a sulfate ion or a nitrate ion. For example, there are 500 milligrams per liter (mg/L) of target ions (e.g., both sulfate ions and nitrate ions) in the drainage water 106, then the first resin may release approximately 500 mg/L of bicarbonate ions into the drainage water 106 as it passes through the first ion exchange column.

As the drainage water 106 passes through the second ion exchange column 104, primarily the chloride ions are removed from the drainage water 106 and exchanged for second ions in the second resin 114. Again, the second ions in the second resin 114 may be, for example, bicarbonate ions, which may exchange substantially one bicarbonate ion for a chloride ion.

The drainage water 106 may then be returned to the irrigation system 116 for reuse. Advantageously, the drainage water 106 is returned to the irrigation system 116 almost completely free of the dissolved sulfate, nitrate and chloride ions.

In order to enhance the exchange of primarily sulfate ions and/or nitrate ions with the first ions and to enhance the exchange of primarily chloride ions with the second ions, the fluid velocity of the drainage water 106 in the first ion exchange column 102 may be configured to be greater than the fluid velocity of the drainage water 106 in the second ion exchange column. In other words, the first ion exchange column 102 may have a first geometry that induces a first fluid velocity of the drainage water 106 through the first ion exchange column 102. Additionally, the second ion exchange column 104 may have a second geometry that induces a second fluid velocity of the drainage water 106 through the second ion exchange column 104, wherein, the second fluid velocity is less than the first fluid velocity.

This may be the case even though the predetermined mass flow of drainage water 106 is substantially equal in both the first and second ion exchange columns 102, 104. For example, the first and second ion exchange columns each may have a substantially cylindrical geometry. The circular cross-sectional area of the first ion exchange column 102 may be about half the circular cross-sectional area of the second ion exchange column 104. In that case, much like a river which flows as fast moving rapids through a narrow gorge and later flows as slow moving calm water when the river becomes wider, the first fluid velocity of drainage water 106 through the relatively narrow first ion exchange column 102 will be about twice the second fluid velocity of the drainage water 106 in the wider second ion exchange column 104. By way of example, the second fluid velocity in the second ion exchange column 104 may be about one third to two thirds the first fluid velocity in the first ion exchange column 102, in order to maximize the ion exchange for the target ions in both ion exchange columns 102, 104.

Advantageously, the ion exchange system 100 separates the valuable nutrients (sulfate and nitrate ions) from the chloride ions. More specifically, because the chloride ions are segregated from the sulfate and/or nitrate ions, the sulfate and/or nitrate ions can be easily processed into a fertilizer for reuse, while the chloride ions can be treated to sequester the chloride.

Figure 2:
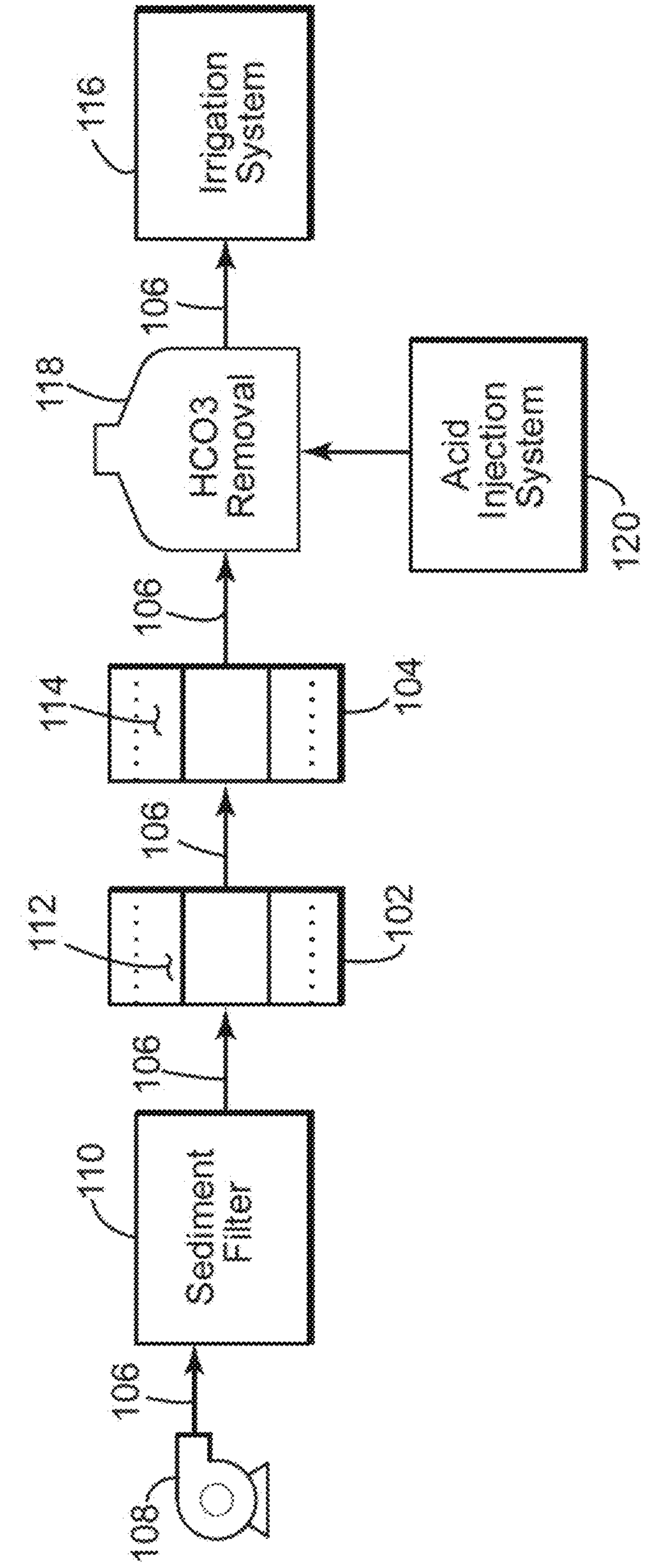
FIG. 2 depicts an example of a schematic view of the ion exchange system of FIG. 1 wherein acid is injected into the drainage water that is discharged from the second ion exchange column to convert bicarbonate into carbon dioxide prior to irrigation.

Referring to FIG. 2, an example is depicted of a schematic view of the ion exchange system 100 of FIG. 1, wherein acid is injected into the drainage water 106 that is discharged from the second ion exchange column 104 to convert bicarbonate ($HCO_3$) into carbon dioxide ($CO_2$) prior to being reintroduced back into the irrigation system 116.

As the drainage water 106 passes through the first and second ion exchange columns 102, 104, it will pick up a substantial amount of bicarbonate ions ($HCO_3$) in exchange for releasing its chloride, sulfate and/or nitrate ions. However, the ion exchange system 100 may be configured to include a bicarbonate removal tank 118. The bicarbonate removal tank 118 may be configured to receive the drainage water 106 that is discharged from the second ion exchange column 104. Thereafter, an acid injection system 120, may be configured to inject acid into the bicarbonate removal tank 118. The acid will convert bicarbonate ions ($HCO_3$) contained in the drainage water 106 into carbon dioxide ($CO_2$), which may be used for other purposes. The drainage water 106 will be substantially free of bicarbonate ions and may then be reintroduced into the irrigation system 116. Advantageously, the drainage water 106 is returned to the irrigation system 116 almost completely free of the dissolved sulfate and/or nitrate, chloride, and bicarbonate ions.

Figure 3:
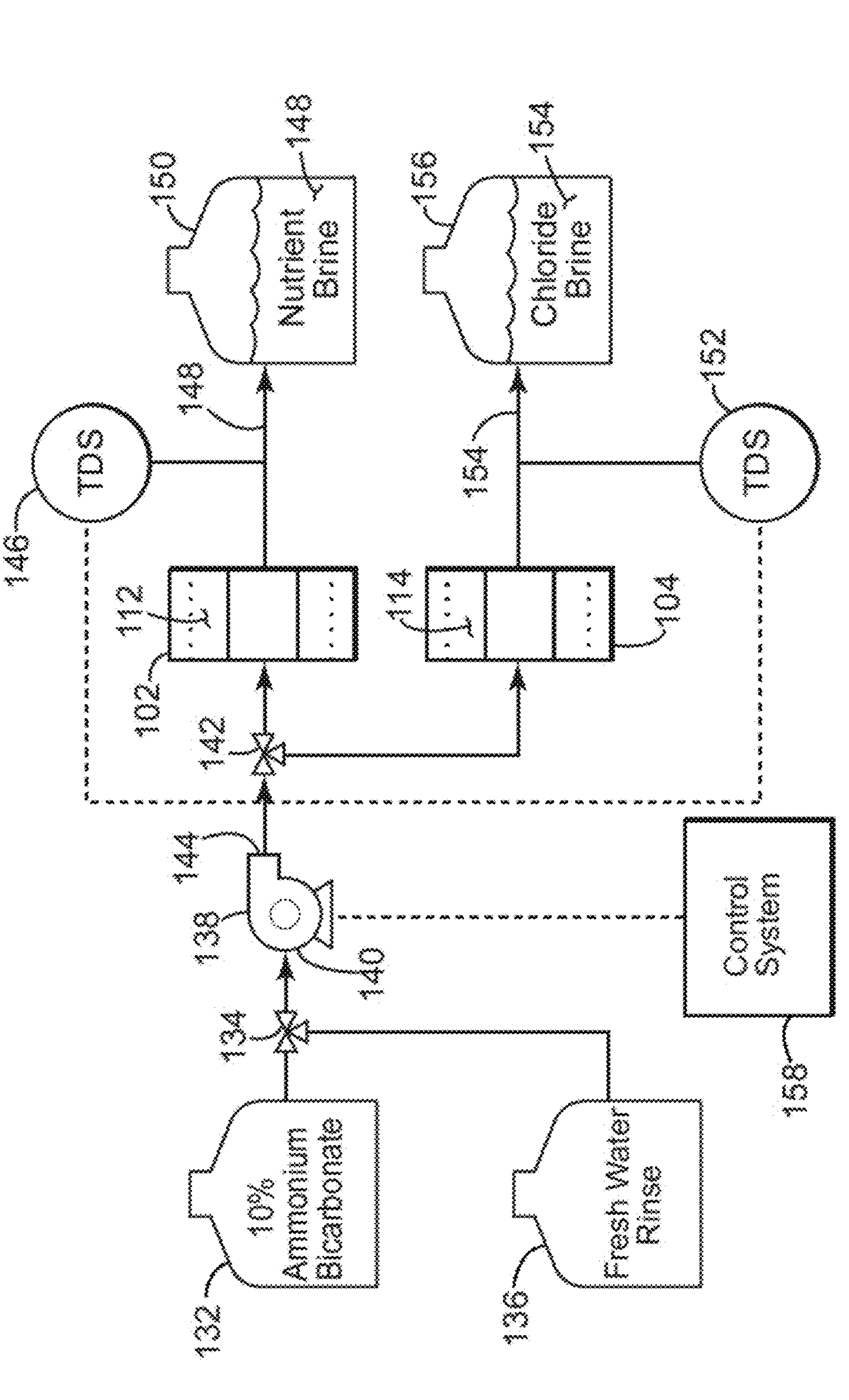
FIG. 3 depicts an example of a schematic view of a regeneration system associated with the ion exchange system of FIG. 1, according to aspects described herein.

Referring to FIG. 3, an example is depicted of a schematic view of a regeneration system 130 associated with the ion exchange system 100 of FIG. 1, according to aspects described herein. After the drainage water has passed through the first and second ion exchange columns 102, 104, a regeneration system 130 may be used to regenerate the first ions in the first resin 112 and the second ions in the second resin 114 with bicarbonate ions. This regeneration process may occur during off hours or once the first and second resins 112, 114 have become fully exchanged with the chloride, sulfate, and/or nitrate ions.

The regeneration system 130 may include a first tank configured to contain a regenerate solution of ammonium bicarbonate. The regenerate solution may be in the form of a 10% ammonium bicarbonate solution. The first tank 132 is in selective fluid communication with a first three-way valve 134.

A second tank 136 of the regeneration system 130 is configured to contain fresh water. The second tank 136 is also in selective fluid communication with the first three-way valve 134. A first pump 138 has an intake port 140 in fluid communication with the first three-way valve 134.

A second three-way valve 142 is in fluid communication with an output port 144 of the first pump 138. The second three-way valve 142 is also in selective fluid communication with the first ion exchange column 102 and second ion exchange column 104. The first pump 138 is configured to pump the ammonium bicarbonate solution of the first tank 132 and the fresh water solution of the second tank 136 in the reverse flow direction, relative to the flow of drainage water 106, through either the first ion exchange column 102 or the second ion exchange column 104.

A first total dissolved solid (TDS) meter 146 monitors the percentage of total dissolved solids in discharge fluid (i.e., nutrient brine) 148 from the first ion exchange column 102. The nutrient brine 148 from the first ion exchange column flows into, and is collected in, a nutrient brine tank 150. A second TDS meter 152 monitors the percentage of TDS in discharge fluid (i.e., chloride brine) 154 from the second ion exchange column 104. The chloride brine 154 from the second ion exchange column 104 flows into, and is collected in, a chloride brine tank 156. The first and second TDS meters 146, 152 are in electronic communication with a control system 158, which is operable to control the operation of the first pump 138 and selection of the first and second three-way valves 134, 142. The first and second three-way valves 134, 142 are operable, via control system 158, to selectively provide fluid communication between:

the first tank 132 and the first ion exchange column 102, the first tank 132 and the second ion exchange column 104, the second tank 136 and the first ion exchange column 102, and the second tank 136 and the second ion exchange column 104.

During operation, the regeneration system 130 is operable to pump, via the first pump 134, the regenerate solution (i.e., the ammonium bicarbonate solution) at a first flow rate from the first tank 132 through the first ion exchange column 102 in a reverse flow direction relative to the flow of drainage water 106. The resulting nutrient brine 148 from the first ion exchange column 102 is collected in the nutrient brine tank 150. The first TDS meter 146 monitors the amount of total dissolved solids (including the sulfate and/or nitrate ions) in real time and stops the process when the amount of TDS in the nutrient brine 148 has fallen to a value that is close to the TDS of the fresh water.

Thereafter, fresh water is pumped, via the first pump 138, at a second flow rate from the second tank 136 through the first ion exchange column 102 in the reverse flow direction. The fresh water is used to flush any additional contaminants out of the first ion exchange column 102. A resulting first water effluent from the first ion exchange column 102 is then collected in the nutrient brine tank 150. This is a fast rinse process, wherein the second flow rate of fresh water is faster than the first flow rate of regenerate solution.

At this point, the first ion exchange column 102 has been fully regenerated to a bicarbonate form. The nutrient brine tank 150 now contains ammonium salts of sulfate and/or nitrate and ammonium bicarbonate. This mixture can then be reused as a fertilizer. Bicarbonate ($HCO_3$) contained in the nutrient brine tank 150 can be removed by acid injection as discussed earlier with respect to FIG. 2.

The second ion exchange column 104 may also be regenerated using substantially the same process. More specifically, during operation of the regeneration system 130, the regenerate solution may be pumped, via the first pump 138 at a third flow rate from the first tank 132 through the second ion exchange column 104 in the reverse flow direction. The resulting chloride brine 154 from the second ion exchange column 104 is collected in the chloride brine tank 156. The second TDS meter 152 monitors the amount of total dissolved solids (including the chloride ions) in real time and stops the process when the amount of TDS in the chloride brine 154 has fallen to a value that is close to the TDS of the fresh water.

Thereafter, fresh water is pumped, via the first pump 138, at a fourth flow rate from the second tank 136 through the second ion exchange column 104 in the reverse flow direction. The fresh water is used to flush any additional contaminants out of the second ion exchange column 104. A resulting first water effluent from the second ion exchange column 104 is then collected in the chloride brine tank 156. This is a fast rinse process, wherein the fourth flow rate of fresh water is faster than the third flow rate of regenerate solution. At this point the second ion exchange column has been fully regenerated back to a bicarbonate form.

Figure 4:
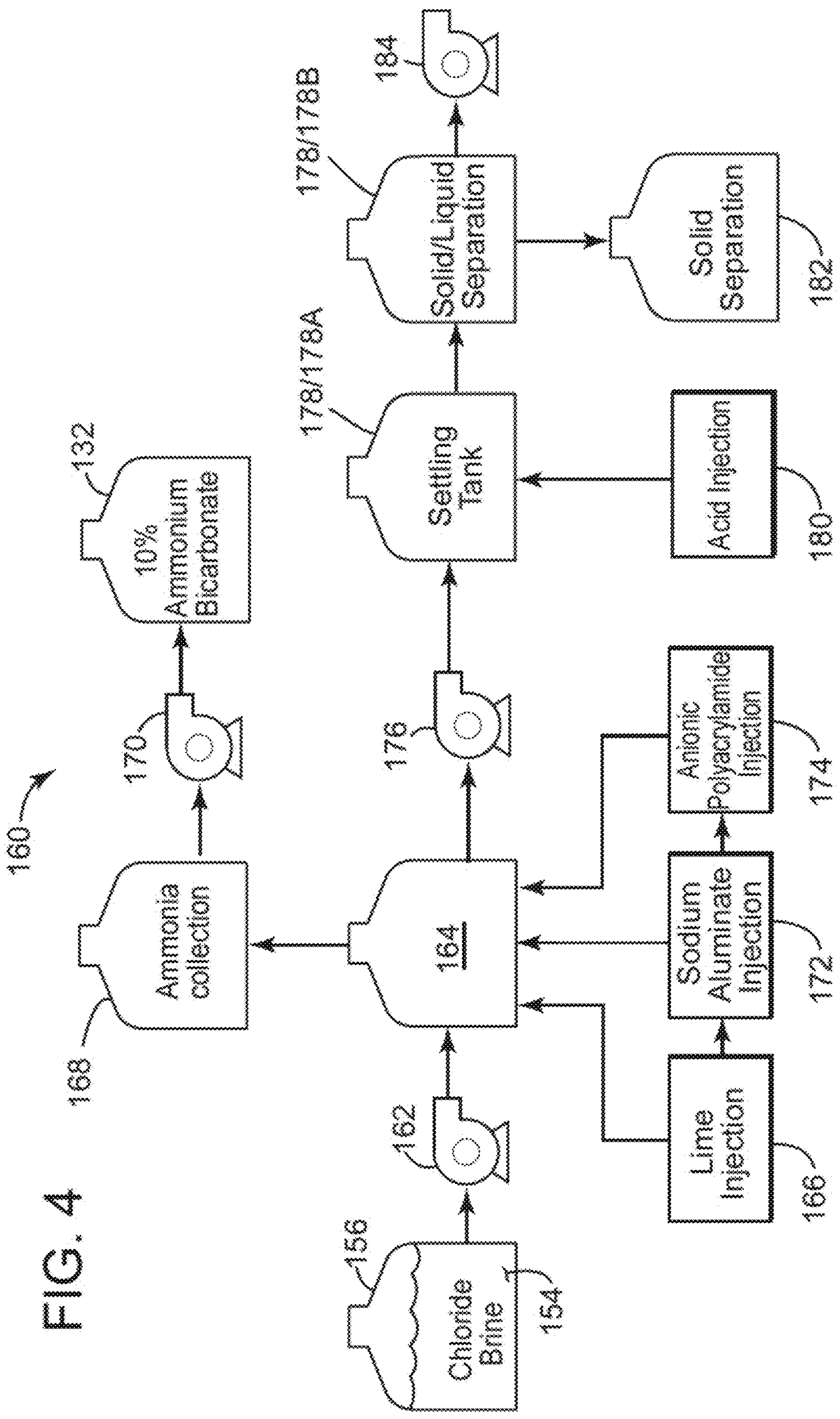
FIG. 4 depicts an example of a schematic view of a brine processing system associated with the regeneration system of FIG. 3, according to aspects described herein.

Referring to FIG. 4, an example is depicted of a schematic view of a chloride brine processing system 160 associated with the regeneration system 130 of FIG. 3, according to aspects described herein. The chloride brine 154 collected in the chloride brine tank 156 during the regeneration process is a combination of ammonium salts, which requires further processing via a chloride brine processing system, such as the chloride brine processing system 160 of FIG. 4, prior to being reintroduced back into the irrigation system 116.

The chloride brine processing system 160 includes a second pump 162 configured to pump the chloride brine 154 from the chloride brine tank 156 to a first holding tank 164. A lime injection system 166 is configured to inject lime into the first holding tank 164 to raise the pH of the chloride brine 154 to about 12 and to convert the ammonium ($NH_4$) in the chloride brine 154 to ammonia ($NH_3$) gas. An ammonia collection tank 168 is configured to collect the ammonia gas. A third pump 170 is configured to pump the ammonia gas into the first tank 132 of the regeneration system 130. Advantageously, the ammonia gas is not wasted, but rather is incorporated into the regenerate solution of ammonium bicarbonate in the first tank 132.

The chloride brine processing system 160 may also include a sodium aluminate injection system 172, which is configured to inject sodium aluminate into the first holding tank 164 to form a calcium-aluminum-chloride based Friedel's salt. An anionic polyacrylamide (PAM) injection system 174 may be configured to inject PAM into the first holding tank 164 to result in a suspension of solids and supernatant.

A fourth pump 176 may be configured to pump the suspension into an at least one settling tank 178. The at least one settling tank 178 may be a single first settling tank 178A or may include additional settling tanks, such as second settling tank 178B. In the example illustrated in FIG. 4, two settling tanks 178A and 178B are shown. An acid injection system 180 may be configured to inject acid into the first settling tank 178A to reduce the pH of the suspension to about 7 and to convert bicarbonate ions ($HCO_3$) into carbon dioxide ($CO_2$).

The first settling tank 178A may be configured to enable the solids of the suspension to be drained off of the bottom of the first settling tank 178A. Alternatively, the suspension may be moved to the second settling tank 178B of the at least one settling tanks 178, wherein the solids may be separated by draining the solids from the bottom of the second settling tank 178B and deposited in a solid collection tank 182.

At this point, the resulting supernatant in the second settling tank 178B is advantageously free of substantially all chloride ions. Therefore, the resulting supernatant may be pumped, via a fifth pump 184 back into the irrigation system 116.

Figure 5:
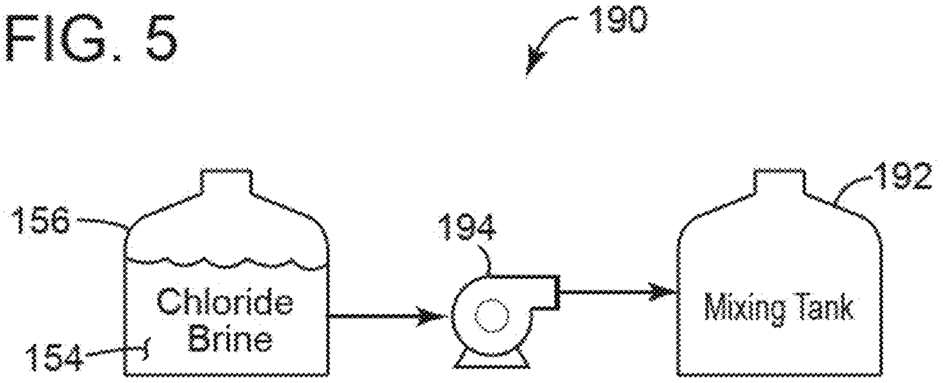
FIG. 5 depicts an example of a schematic view of another brine processing system associated with the regeneration system of FIG. 3, according to aspects described herein.

Referring to FIG. 5, an example is depicted of a schematic view of another brine processing system 190 associated with the regeneration system 130 of FIG. 3, according to aspects described herein. The chloride brine processing system 190 may include a mixing tank 192 containing calcinated hydrotalcite. The calcinated hydrotalcite is operable to absorb the chloride from the chloride brine 154 of the chloride brine tank 156. The chloride brine 154 may be pumped from the chloride brine tank 156 via a sixth pump 194. The calcinated hydrotalcite may then be landfilled once it reaches its maximum capacity for chloride.

Figure 6:
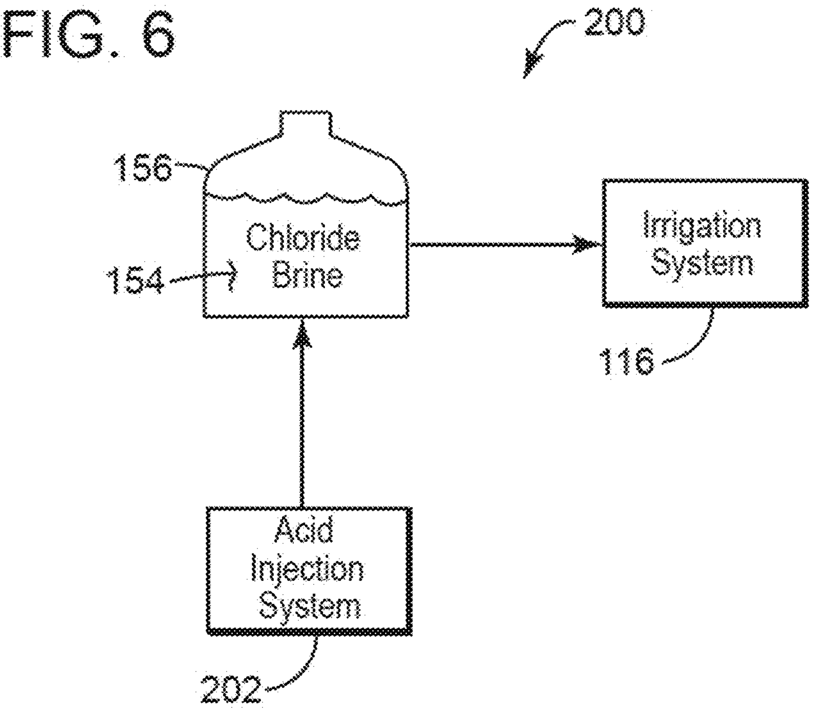
FIG. 6 depicts an example of a schematic view of another brine processing system associated with the regeneration system of FIG. 3, according to aspects described herein.

Referring to FIG. 6, an example is depicted of a schematic view of another brine processing system 200 associated with the regeneration system of FIG. 3, according to aspects described herein. The chloride brine processing system 200 may include an acid injection system 202. The acid injection system may be configured to inject an acid into the chloride brine 154 of the chloride brine tank 156 to convert bicarbonate ($HCO_3$) of the chloride brine 154 into carbon dioxide ($CO_2$) and leaving an ammonium based liquid fertilizer. The fertilizer may be pumped back into the irrigation system 116.

Figure 7:
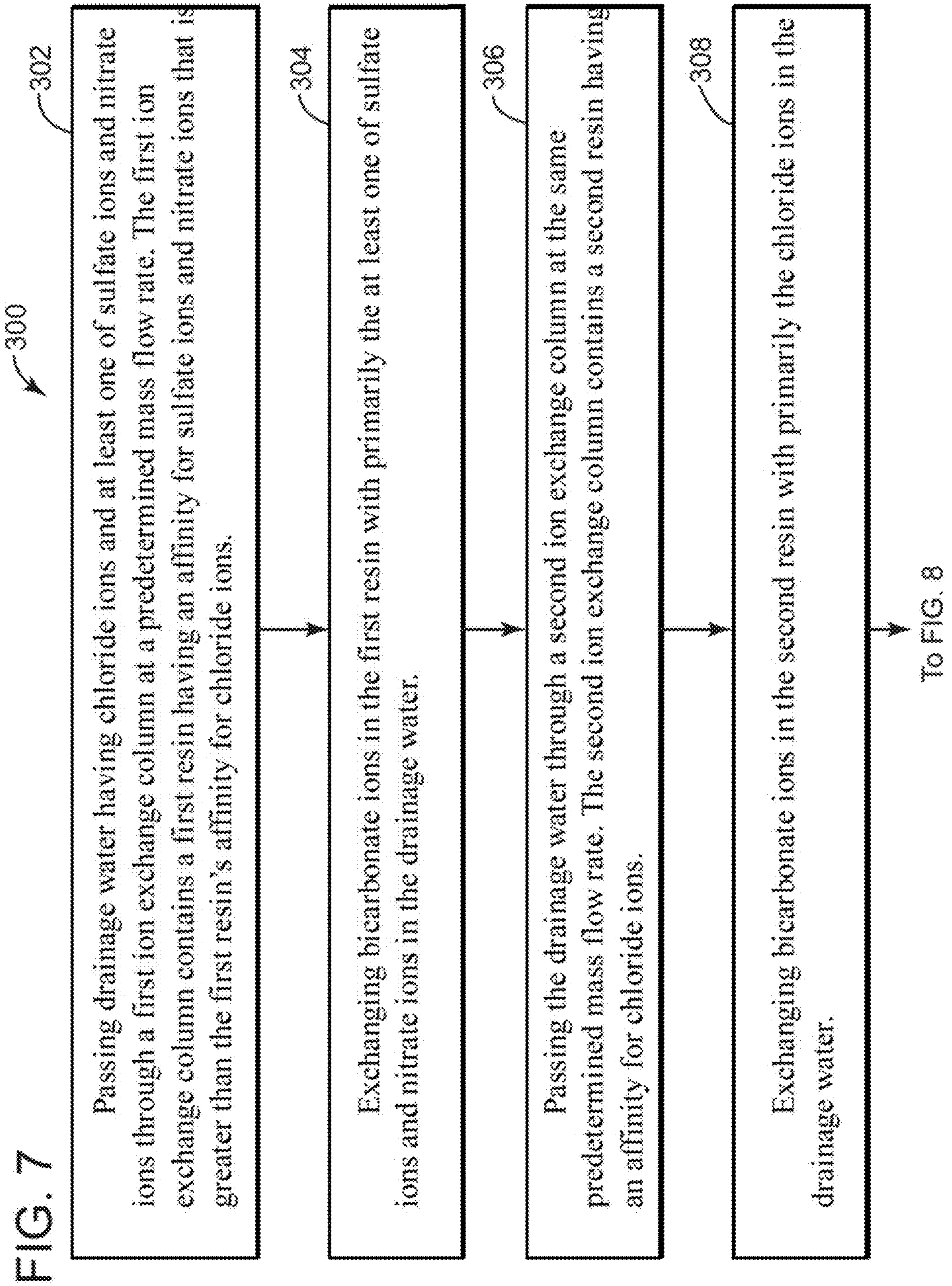
FIG. 7 depicts a flow diagram of a method of removing ions from drainage water, using a first ion exchange column in series fluid communication with a second ion exchange column, according to aspects described herein.

Referring to FIG. 7, a flow diagram is depicted of a method 300 of removing chloride ions, sulfate ions and/or nitrate ions from drainage water 106, using a first ion exchange column 102 in series fluid communication with a second ion exchange column 104 as exemplified in FIG. 1, according to aspects described herein. Drainage water 106 may come from irrigation water that is used to irrigate crops in an agricultural system and then drained through an agricultural drainage system. Such drainage water often contains chloride ions, sulfate ions and/or nitrate ions that should be separated from the drainage water before being returned to the local ecosystem. The sulfate ions and/or nitrate ions can easily be processed into a fertilizer that provides nutrients for crops on an irrigation system 116. However, chloride ions require additional processing before either being returned to an irrigation system or landfilled. When chloride ions are mixed in with sulfate ions and/or nitrate ions, it has often been difficult to separate them using prior art regeneration systems and often the entire effluent must be landfilled. The following method 300 advantageously provides a cost efficient, low power way of separating the chloride ions from the sulfate ions and/or nitrate ions.

The method begins at 302 wherein drainage water 106 having chloride ions and at least one of sulfate ions and nitrate ions is passed through a first ion exchange column 102 at a predetermined mass flow rate. The first ion exchange column 102 containing a first resin 112 having an affinity for sulfate ions and nitrate ions that is greater than the first resin's affinity for chloride ions.

At 304, bicarbonate ions in the first resin are exchanged with primarily the at least one of sulfate ions and nitrate ions in the drainage water 106.

At 306, the drainage water 106 is passed through a second ion exchange column 104 at the same predetermined mass flow rate. The second ion exchange column contains a second resin 114 having an affinity for chloride ions.

At 308, bicarbonate ions in the second resin 114 are exchanged with primarily the chloride ions in the drainage water 106. Advantageously, the nutrient ions (i.e., nitrate and/or sulfate) are now separated from the chloride ions.

To optimize the exchange of resins, the drainage water 106 passing through the first ion exchange column 102 may do so at a first fluid velocity, and the same drainage water passing through the second ion exchange column 104 may do so at a second fluid velocity, even though the mass flow rate of the fluid is substantially constant in both the first and second ion exchange columns. The second fluid velocity may be less than the first fluid velocity. More specifically, the second fluid velocity may be about one third to two thirds the first fluid velocity for optimal performance. Moreover, the first resin and the second resins may be substantially the same resin.

Additionally, the method may include pumping the drainage water 106 from the second ion exchange column 102 into a bicarbonate removal tank 118 as exemplified in FIG. 2. Thereafter, acid is injected into the bicarbonate removal tank 118 to convert bicarbonate ions ($HCO_3$) contained in the drainage water 106 into carbon dioxide ($CO_2$), prior to pumping the drainage water into an irrigation system 116.

Figure 8:
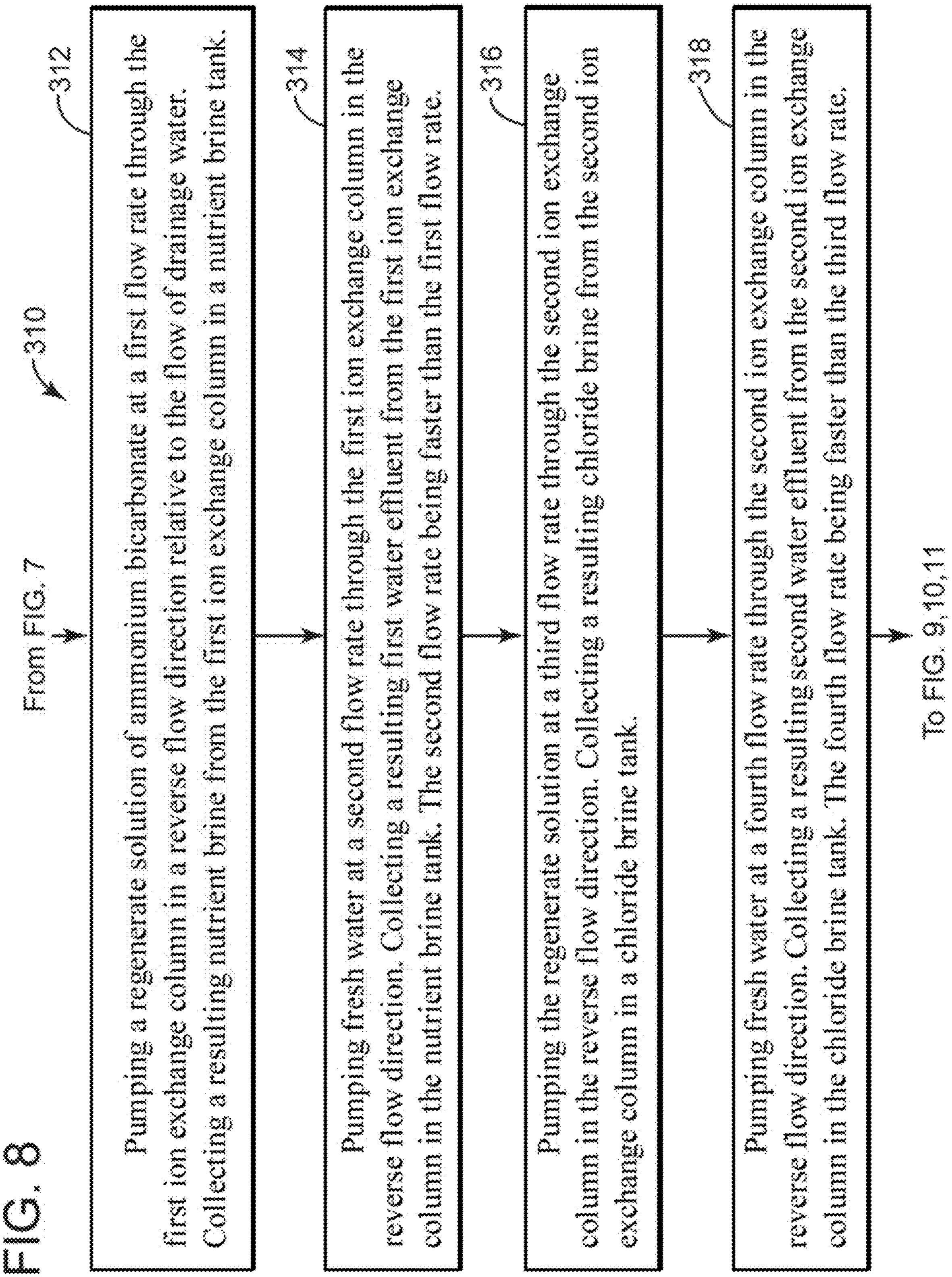
FIG. 8 depicts a flow diagram of a method of regenerating the first and second ion columns of FIG. 7, wherein nutrient brine from the first ion exchange column is pumped into a nutrient tank and chloride brine from the second ion exchange column is pumped into a chloride brine tank, according to aspects described herein.

Referring to FIG. 8, a flow diagram is depicted of a method 310 of regenerating the first and second ion columns 102, 104 of FIG. 7. The nutrient brine 148 (containing sulfate ions and/or nitrate ions) from the first ion exchange column 102 is pumped into a nutrient tank 150 and chloride brine 154 from the second ion exchange column 104 is pumped into a chloride brine tank 156 (as illustrated in FIG. 3), according to aspects described herein.

The method begins at 312, wherein a regenerate solution of ammonium bicarbonate is pumped at a first flow rate through the first ion exchange column 102 in a reverse flow direction relative to the flow of drainage water. The resulting nutrient brine 148 is collected from the first ion exchange column 102 in the nutrient brine tank 150.

At 314 of the method 300, fresh water is pumped at a second flow rate through the first ion exchange column 102 in the reverse flow direction. The resulting first water effluent from the first ion exchange column 102 is collected in the nutrient brine tank 150. The second flow rate may be faster than the first flow rate.

At 316, the regenerate solution is pumped at a third flow rate through the second ion exchange column 104 in the reverse flow direction. The resulting chloride brine 154 from the second ion exchange column 104 is collected in the chloride brine tank 156.

At 318, fresh water is pumped at a fourth flow rate through the second ion exchange column 104 in the reverse flow direction. The resulting second water effluent from the second ion exchange column 104 is collected in the chloride brine tank 156. The fourth flow rate is faster than the third flow rate.

Figure 9:
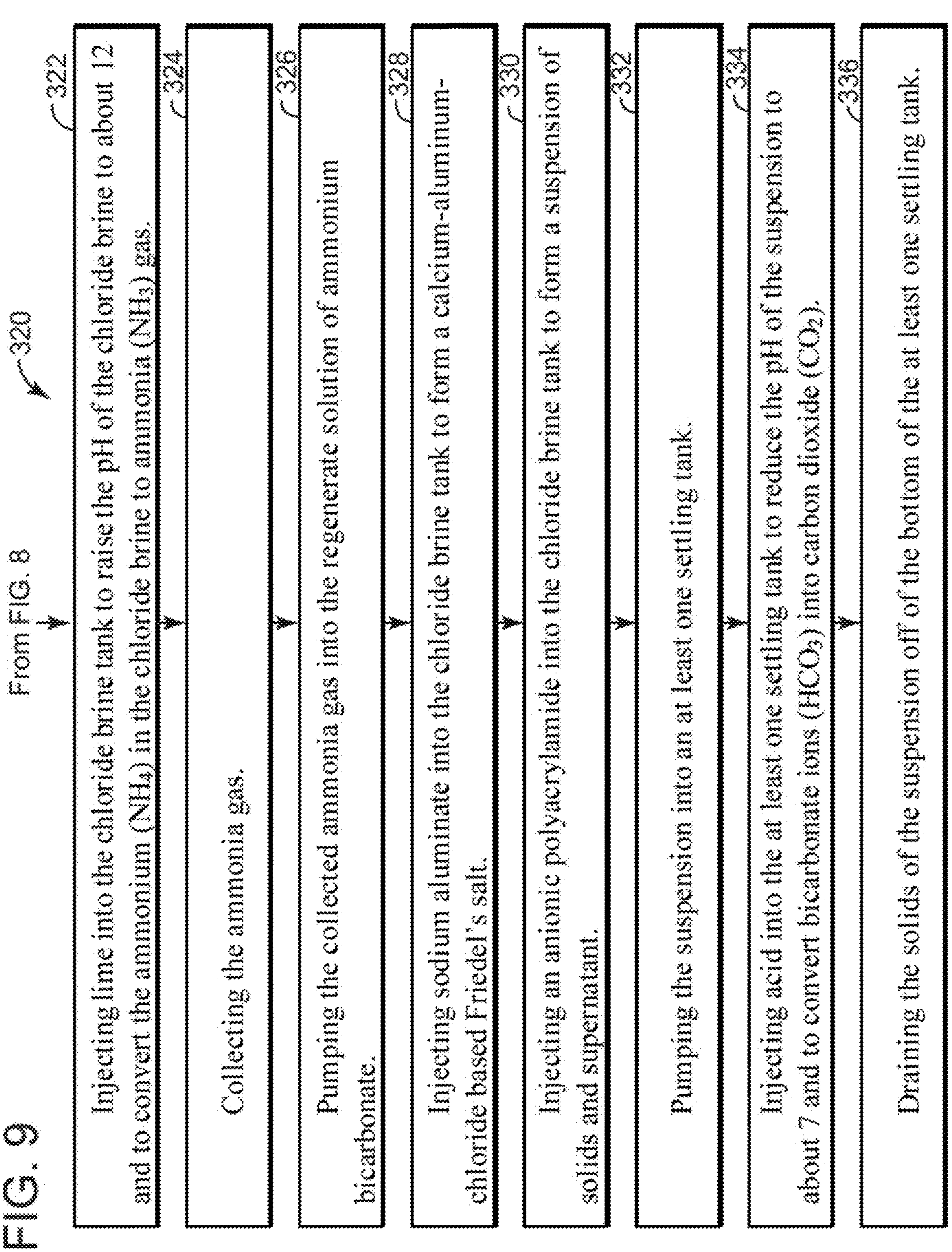
FIG. 9 depicts a flow diagram of a method of processing the chloride brine tank of FIG. 8, according to aspects described herein.

Referring to FIG. 9, a flow diagram of a method 320 of processing chloride brine 154 of the chloride brine tank of FIG. 8 is depicted, according to aspects described herein. The chloride brine 154 collected in the chloride brine tank 156 during the regeneration process is a combination of ammonium salts, which requires further processing via a chloride brine method, such as the chloride brine processing method 320 of FIG. 9, prior to being reintroduced back into the irrigation system 116.

The method begins at 322, wherein lime is injected into the chloride brine tank 156 to raise the pH of the chloride brine 154 to about 12 and to convert the ammonium ($NH_4$) in the chloride brine 154 to ammonia ($NH_3$) gas.

At 324, the ammonia gas is collected.

At 326, the collected ammonia gas is advantageously pumped back into the regenerate solution of ammonium bicarbonate in the ammonium bicarbonate tank 132 for further use.

At 328 of the method 320, sodium aluminate is injected into the chloride brine tank 156 to form a calcium-aluminum-chloride based Friedel's salt.

At 330, an anionic polyacrylamide (PAM) is injected into the chloride brine tank 156 to form a suspension of solids and supernatant.

At 332, the suspension is pumped into an at least one settling tank 178. There may be more than one settling tank, such as a first settling tank 178A and a second settling tank 178B, as illustrated in FIG. 4.

At 334, acid is injected into the at least one settling tank 178 to reduce the pH of the suspension to about 7 and to convert bicarbonate ions ($HCO_3$) into carbon dioxide ($CO_2$).

At 336, the solids of the suspension are drained off of the bottom of the at least one settling tank 178.

Referring to FIG. 10, a flow diagram is depicted of another method 340 of processing the chloride brine 154 in the chloride brine tank 156 of FIG. 8, according to aspects described herein.

The method begins at 342, wherein the chloride brine 154 of the chloride brine tank 156 is mixed with calcinated hydrotalcite. The calcinated hydrotalcite is operable to absorb the chloride from the chloride brine 154 of the chloride brine tank 156. Once the calcinated hydrotalcite reaches its maximum capacity for absorbing the chloride brine 154, the calcinate hydrotalcite is landfilled.

Referring to FIG. 11, a flow diagram of another method 350 of processing the chloride brine 154 of the chloride brine tank of FIG. 8 is depicted, according to aspects described herein.

The method begins at 352, wherein an acid is injected into the chloride brine 154 of the chloride brine tank 156. The acid converts the bicarbonate ($HCO_3$) of the chloride brine 154 into carbon dioxide ($CO_2$), leaving an ammonium based liquid fertilizer. The liquid fertilizer may be introduced into an irrigation system 116.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. An ion exchange system for treating agricultural drainage water from an irrigation system, the ion exchange system comprising:

a first ion exchange column containing a first resin having an affinity for sulfate ions and nitrate ions that is greater than the first resin's affinity for chloride ions, the first ion exchange column configured to pass a predetermined mass flow rate of drainage water from an irrigation system therethrough, the drainage water introduced into the first ion exchange column having chloride ions and at least one of sulfate ions and nitrate ions contained therein; and a second ion exchange column connected in series fluid communication with the first ion exchange column, the second ion exchange column containing a second resin having an affinity for chloride ions, the second ion exchange column configured to pass the same predetermined mass flow rate of drainage water therethrough;

wherein, as the drainage water passes through the first ion exchange column, the at least one of the sulfate ions and nitrate ions are removed from the drainage water and exchanged for first bicarbonate ions in the first resin resulting in a first drainage water discharge fluid with removed sulfate or nitrate ions and added first bicarbonate ions;

wherein, as the first drainage water discharge fluid passes through the second ion exchange column, chloride ions are removed from the drainage water and exchanged for second bicarbonate ions in the second resin resulting in a second drainage water discharge fluid with removed chloride ions and added second bicarbonate ions;

the ion exchange system further comprising a regeneration system, the regeneration system comprising, a first tank configured to contain a regenerate solution of ammonium bicarbonate, a first pump having an intake port and an output port, the intake port in fluid communication with the first tank and the output port in selective fluid communication with the first and second ion exchange columns, a first total dissolved solid (TDS) meter configured to monitor a percentage of TDS in a nutrient brine being discharged from the first ion exchange column, a second TDS meter configured to monitor a percentage of TDS in a chloride brine being discharged from the second ion exchange column a nutrient brine tank configured to collect a resulting nutrient brine containing the at least one of the sulfate ions and nitrate ions that are discharged from the first ion exchange column, a chloride brine tank configured to collect a resulting chloride brine containing the chloride ions that are being discharged from the second ion exchange column, and a control system in electronic communication with at least the first and second TDS meters and the first pump, and wherein the control system is configured to operate the regeneration system at least to:

pump, via the first pump, the regenerate solution from the first tank through the first ion exchange column in a reverse flow direction relative to the flow of drainage water, and collect a resulting nutrient brine containing the at least one of the sulfate ions and nitrate ions that are discharged from the first ion exchange column in a nutrient brine tank, monitor, via the first TDS meter, the percentage of TDS in the nutrient brine being discharged from the first ion exchange column in real time, stop pumping the regenerant solution through the first ion exchange column when the first TDS meter indicates that a percentage of TDS in the nutrient brine being discharged from the first ion exchange column falls to a first predetermined threshold value, switch to pumping, via the first pump, the regenerate solution from the first tank through the second ion exchange column in the reverse flow direction, and collect a resulting, chloride brine containing the chloride ions that are being discharged from the second ion exchange column in a chloride brine tank, monitor, via the second TDS meter, the percentage of TDS in the chloride brine being discharged from the second ion exchange column in real time, and stop pumping the regenerant solution through the second ion exchange column when the second TDS meter indicates that a percentage of TDS in the chloride brine being discharged from the second ion exchange column falls to a second predetermined threshold value.

2. The ion exchange system of claim 1, comprising:

the first ion exchange column having a first geometry that induces a first fluid velocity of the drainage water through the first ion exchange column, and the second ion exchange column having a second geometry that induces a second fluid velocity of the first drainage water discharge fluid through the second ion exchange column, the second fluid velocity being less than the first fluid velocity.

3. The ion exchange system of claim 2, wherein the second fluid velocity is about one third to two thirds the first fluid velocity.

4. The ion exchange system of claim 1, wherein the second resin has an affinity for sulfate ions and nitrate ions that is greater than the second resin's affinity for chloride ions.

5. The ion exchange system of claim 1, wherein the first resin and the second resin are substantially the same resin.

6. The ion exchange system of claim 1, further comprising:

a bicarbonate removal tank configured to receive the second drainage water discharge fluid that is discharged from the second ion exchange column; and and acid injection system configured to inject acid into the bicarbonate removal tank to convert bicarbonate ions ($HCO_3$) contained in the second drainage water discharge fluid into carbon dioxide ($CO_2$).

7. The ion exchange system of claim 1, wherein the regeneration system comprises:

the first tank in selective fluid communication with a first three-way valve;

a second tank configured to contain fresh water, the second tank in selective fluid communication with the first three-way valve;

the intake port of the first pump being in fluid communication with the first three-way valve;

a second three-way valve in fluid communication with the output port of the first pump and in selective fluid communication with the first and second ion exchange columns;

wherein, the first and second three-way valves are operable, via the control system, to selectively provide fluid communication between:

the first tank and the first ion exchange column, the first tank and the second ion exchange column, the second tank and the first ion exchange column, and the second tank and the second ion exchange column.

8. The ion exchange system of claim 7, wherein the regeneration system is operable, via the control system to:

pump, via the first pump, the regenerate solution at a first flow rate from the first tank through the first ion exchange column in the reverse flow direction;

after the first TDS meter indicates that the percentage of TDS in the nutrient brine has fallen to the first predetermined threshold and the pump has stopped pumping the regenerant solution through the first ion exchange column, pump, via the first pump, the fresh water at a second flow rate from the second tank through the first ion exchange column in the reverse flow direction, and collect a resulting first water effluent from the first ion exchange column in the nutrient brine tank, wherein the second flow rate is faster than the first flow rate;

pump, via the first pump, the regenerate solution at a third flow rate from the first tank through the second ion exchange column in the reverse flow direction, after the second TDS meter indicates that the percentage of TDS in the chloride brine has fallen to the second predetermined threshold and the pump has stopped pumping the regenerant solution through the second ion exchange column, pump, via the first pump, the fresh water at a fourth flow rate from the second tank through the second ion exchange column in the reverse flow direction, and collect a resulting second water effluent from the second ion exchange column in the chloride brine tank, wherein the fourth flow rate is faster than the third flow rate.

9. The ion exchange system of claim 8, wherein the regeneration system comprises a chloride brine processing system, the chloride brine processing system comprising:

a second pump configured to pump the chloride brine from the chloride brine tank to a first holding tank;

a lime injection system configured to inject lime into the first holding tank to raise the pH of the chloride brine to about 12 and to convert the ammonium ($NH_4$) in the chloride brine to ammonia ($NH_3$) gas;

an ammonia collection tank configured to collect the ammonia gas; and a third pump configured to pump the ammonia gas into the first tank of the regeneration system to be incorporated into the regenerate solution of ammonium bicarbonate in the first tank.

10. The ion exchange system of claim 9, wherein the chloride brine processing system further comprises:

a sodium aluminate injection system configured to inject sodium aluminate into the first holding tank to form a calcium-aluminum-chloride based Friedel's salt;

an anionic polyacrylamide (PAM) injection system configured to inject PAM into the first holding tank to result in a suspension of solids and supernatant; and a fourth pump configured to pump the suspension into an at least one settling tank;

an acid injection system configured to inject acid into the at least one settling tank to reduce the pH of the suspension to about 7 and to convert bicarbonate ions ($HCO_3$) into carbon dioxide ($CO_2$);

wherein the at least one settling tank is configured to enable the solids of the suspension to be drained off of the bottom of the at least one settling tank.

11. The ion exchange system of claim 8, wherein the regeneration system comprises a chloride brine processing system, the chloride brine processing system comprising:

a mixing tank containing calcinated hydrotalcite, wherein the calcinated hydrotalcite is operable to absorb the chloride from the chloride brine of the chloride brine tank.

12. The ion exchange system of claim 8, wherein the regeneration system comprises a chloride brine processing system, the chloride brine processing system comprising:

an acid injection system configured to inject an acid into the chloride brine of the chloride brine tank to convert bicarbonate ($HCO_3$) of the chloride brine into carbon dioxide ($CO_2$) and leaving an ammonium based liquid fertilizer.

13. The ion exchange system of claim 1, wherein:

as the drainage water passes through the first ion exchange column, sulfate ions are removed from the drainage water and exchanged for first ions in the first resin; and as the first drainage water discharge fluid passes through the second ion exchange column, nitrate ions and chloride ions are removed from the drainage water and exchanged for second ions in the second resin.

* * * * *